May 10, 1966   M. E. KECK ETAL   3,250,907
RUNWAY LIGHTING UNIT
Original Filed Feb. 27, 1961   6 Sheets-Sheet 1

INVENTORS
Merle E. Keck &
Charles H. Loch
BY
ATTORNEY

May 10, 1966   M. E. KECK ETAL   3,250,907
RUNWAY LIGHTING UNIT
Original Filed Feb. 27, 1961   6 Sheets-Sheet 2

May 10, 1966 M. E. KECK ETAL 3,250,907
RUNWAY LIGHTING UNIT
Original Filed Feb. 27, 1961 6 Sheets-Sheet 5

3,250,907
RUNWAY LIGHTING UNIT
Merle E. Keck and Charles H. Loch, Cleveland, Ohio, assignors to Westinghouse Electric Corporation, Pittsburgh, Pa., a corporation of Pennsylvania
Continuation of application Ser. No. 92,049, Feb. 27, 1961. This application May 10, 1965, Ser. No. 459,506
12 Claims. (Cl. 240—1.2)

This application is a continuation of application Serial No. 92,049 filed February 27, 1961, now forfeited and assigned to the same assignee as this application.

This invention relates to flush-type runway and approach lighting units and more particularly to an optical system therefor comprising a novel top casting assembly and optical structure to permit light rays to reach or approach an angle of zero degrees with respect to the runway surface.

With the advent of high-speed jet aircraft many new problems have been created for both military and civilian airports. Among these is the need for better lighting to ensure instant and continuous identification of the runway position and configuration for the pilot. To increase the safety margin for planes that land at high speeds, many airports have extended the paved area many feet beyond the runway threshold, or well into the area normally occupied by approach lights. This means that some of the approach lights have been forced to go underground, i.e., be embedded in the runway, so as to eliminate obstructions in this overrun area of the runway. In this way several flush approach lighting units have evolved. A unit of this type that preceded the present invention is shown in copending application by W. A. Pennow et al., Serial No. 53,006, filed August 30, 1960, now U.S. Patent No. 3,113,726, entitled "Runway Lighting Unit," and assigned to the same assignee as is this invention.

The aforementioned flush approach lighting units, commonly called "Inset Flush Lights," are generally embedded in the runway so that the top surface thereof is flush, or substantially flush, with the runway surface. One of the main problems in developing such a unit is to enable it to present a light beam which can also remain very nearly parallel to the runway surface, that is, approach an angle of zero degrees with respect to the runway surface. It is readily understood that light rays cannot be emitted parallel to the surfaec of a runway unless some portion of the lens projects some distance above that runway surface. The greater the distance which the lens projects above the runway surface the greater is the intensity of light, or candlepower, that can be obtained on that surface. Since inset flush lighting units generally are permitted to extend only a small fraction of an inch above the surface, the ability to produce an effective beam is greatly impaired if the lens is not permitted to extend substantially to the top surface of the lighting unit.

In previous designs, such as illustrated in the aforementioned copending application, it has ben necessary to protect the lens with some sort of thick metal covering otherwise aircraft wheels, tail hooks or even runway snow plows would come in direct contact with the lens so as to crack or chip it and destroy its refracting qualities. Of course, this metal covering required that the uppermost extent of the lens be located below the runway surface so as to limit the effectiveness of the unit in producing beams substantially parallel to that surface.

However, with the advent of the present invention, it has now become practical to construct an inset flush lighting unit wherein the top surface of a newly designed lens can be flush with the top surface of the lighting unit, or nearly so, providing it is supported properly within that unit so that abrasion, shock, and vibrations will not injure its refractive qualities to any appreciable extent.

Accordingly, one of the objects of this invention is to provide a flush-mounted lighting unit which emits light beams directed generally parallel or at a very small angle to the runway surface.

Another object of the present invention is to provide an inset type lighting unit wherein the uppermost extent of a lens contained therein is flush or nearly flush with the top extent of the unit to permit rays of light emitted therefrom to be substantially parallel with a runway surface when the unit is in its installed operative position.

A further object of the present invention is to provide an inset flush lighting unit which permits maximum exposure of the elevational extent of the lens contained therein without appreciably distrubing its operativeness.

A still further object of the present invention is to provide an optical design for an inset flush lighting unit such that only a limited top surface area of a lens flush with the top of the unit is exposed from above to substantially eliminate the problem of damage by direct impact of heavily-weighted objects from above.

Another object of the present invention is to provide a mounting for a lens of an inset lighting unit so as to permit the lens in the cast housing of the unit to transmit most of the shock and impact directed thereagainst to the lens supporting components within the housing.

Still another object of the present invention is to provide an inset lighting unit housing for a relatively strong lens material such that optimum results from the optical system contained therein can be achieved.

Yet another object of the present invention is the provision of a housing for an inset lighting unit such that little or no metal, or other similar material, is placed over part of the top surface of the lens of the unit.

Another object of the present invention is to provide an optical system for an inset type runway lighting unit which effectively provides for beams of light substantially or very nearly parallel to a runway surface in both unidirectional and bidirectional modifications.

A further object of the present invention is to provide cavities for trapezoidal shaped lens flanges and a plate and cushioning material to support the lens within the cavities to enable the lens to take shock and impact without appreciable damage thereto.

Another object of the present invention is to provide a new lens or optical structure which can be supported within an inset lighting unit housing in a novel and efficient manner.

Still another object of the present invention is to provide an inset lighting unit lens, the lens being adaptable to being changed so as to be received within a lighting unit wherein the top surface of the lens is exposed, covered by a thin layer of hard material, or covered by a substantial layer of material, the bottom supporting structure of the lens being the same in every instance.

These and other objects of the invention will become more apparent upon consideration of the following detail description of some runway lighting units and lens combinations incorporating various components constructed in accordance with the principles of the invention when taken in connection with the following drawings, in which.

In furtherance of the aforementioned objects, the present invention provides an improved optical system for inset type runway lighting units. The top casting of the present invention permits the top edge of a light exiting face of a lens to be flush, or nearly flush, with the top surface of the casting. The invention, however, intends that only a limited surface area of the lens be exposed from above so as to limit as much as possible the problems that are coincident with such an exposed lens. The invention further comprehends a newly designed lens which incorporates wedge shaped flanges extending from the sides of the lens so as to provide, in cooperation with corresponding cavities in the top casting, a unique method of mounting the lens so as to minimize the effects of direct impact or pressure upon that lens. The employment of a bottom support plate and buffering resilient material additionally aids in protecting the lens from the adverse effects of direct impact and pressure. The principles of the present invention can take form in any different modifications as will be apparent from the description thereof and as illustrated in unidirectional and bidirectional embodiments, for example.

Figure 1:
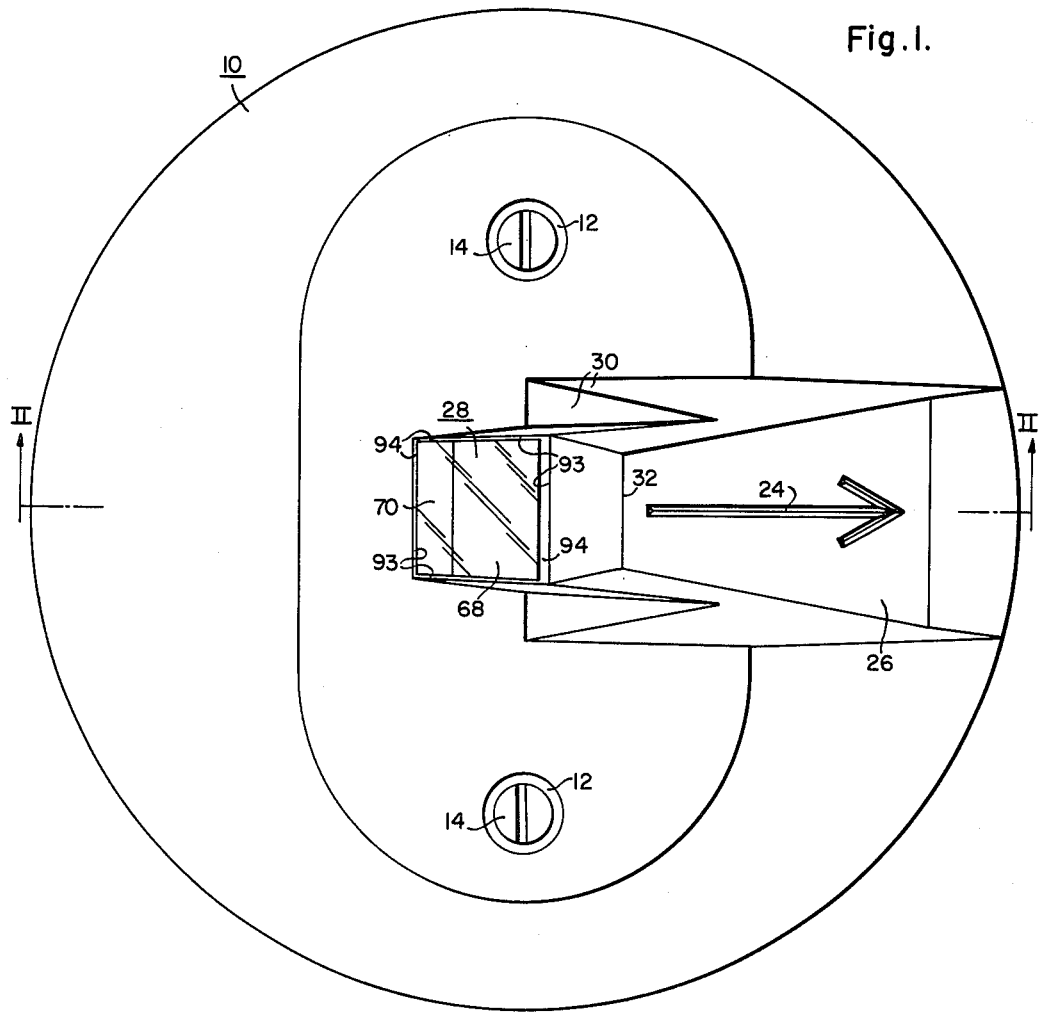
FIGURE 1 is a top plan view of an inset flush lighting unit constructed in accordance with the principles of this invention.
Figure 2:
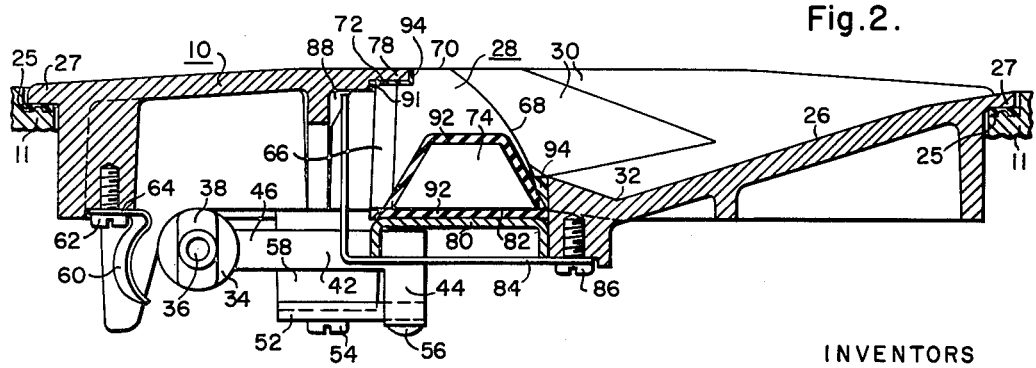
FIG. 2 is a cross-sectional view of the unit of FIG. 1 taken along reference line II—II thereof and with portions broken away for purposes of clarity.
Figure 3:
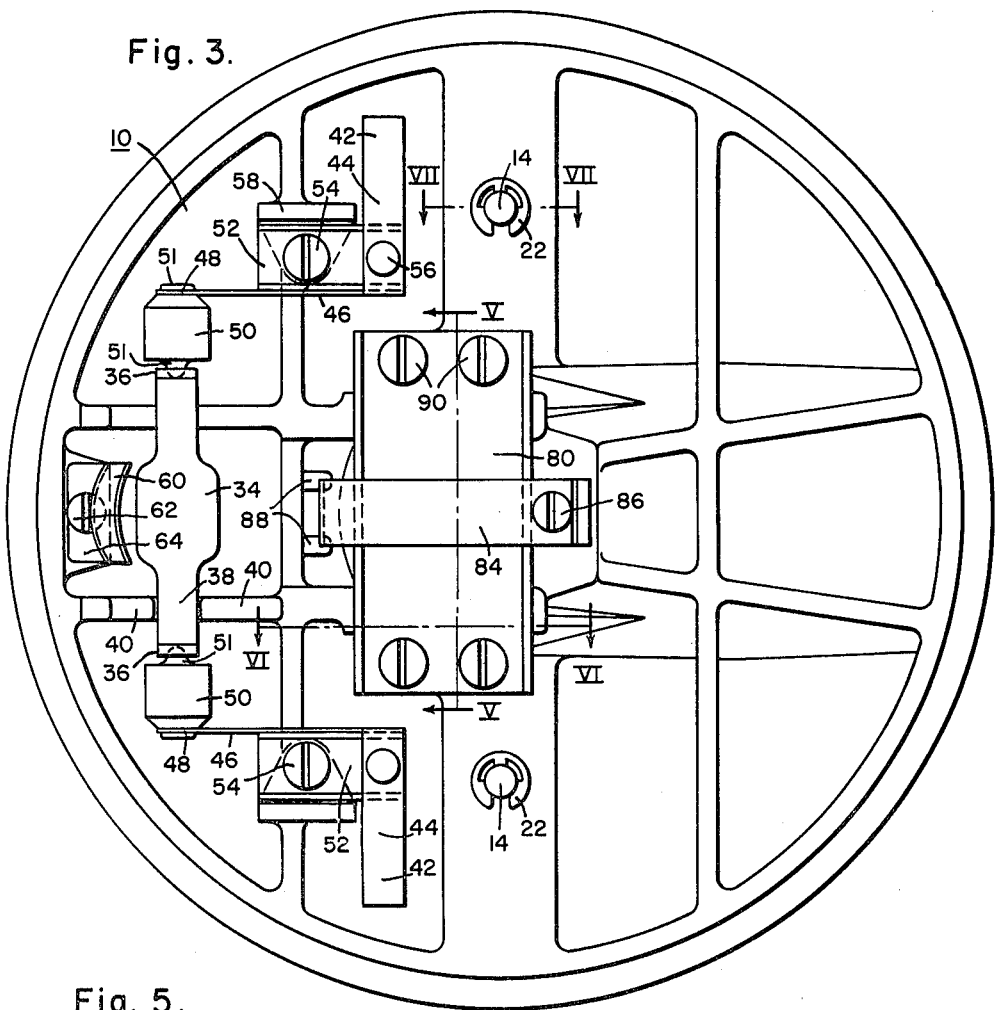
FIG. 3 is a bottom plan view of the top casting and optical assembly of the lighting unit of FIG. 1.

Referring more particularly to FIGS. 1 to 3, it can be seen that the lighting unit of this invention is generally of a circular configuration. The housing or top casting assembly 10 is designed to be mounted in a bottom receptacle 11 set or formed in a shallow hole in concrete runways, taxiways, aprons, and the like, so that the top surface of the assembly 10 is substantially flush with the top surface of concrete. It is generally desirable that the uppermost limit of the top surface of the assembly 10 be not more than ⅛ inch above the runway surface. The bottom receptacle 11 is adapted to receive the assembly 10 and is generally similar to that shown in the aforementioned copending application, only being a somewhat greater depth to accommodate the lower extending components of the present casting assembly. It is because the exact configuration of the bottom receptacle 11 is not important to the concepts of the present invention that it is not shown in detail herein.

Figure 7:
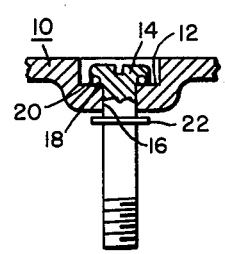
FIG. 7 is a partial cross-sectional view of the attaching means of the assembly of FIG. 3 taken substantially along the reference line VII—VII thereof.
Figure 14:
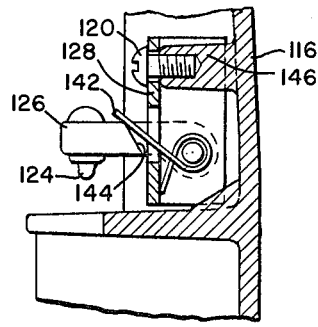
FIG. 14 is a partial cross-sectional view of the assembly of FIG. 12 taken along the reference line XIV—XIV thereof.

To secure the top casting assembly 10 to a bottom receptacle 11 there is provided a recess 12 for receiving a screw 14 through an aperture 16, as best seen in FIGS. 1 and 7. To provide a water tight fit between the top surface of the recess 12 and the screw 14 an O-ring type gasket 18 fits within an annular groove 20 in the head of the screw 14. Thus, by the gasket 18 engaging the top surface of the recess 12 water is prevented from entering through the assembly 10 into the inner portion of the lighting unit. If desired, a metal, fiber, or nylon retaining nut 22 can be used to keep the screw 12 captive in the assembly 10. The screws 14 are so arranged that when mated with their corresponding portions (not shown) in the bottom receptacle 11, the directional arrow 24 engraved in the upper surface of the assembly 10 will be aimed in a direction parallel to or on the runway center line. It is to be understood that other methods of sealably attaching the assembly 10 to the bottom receptacle 11 can be employed without departing from the concepts of the present invention. In addition a gasket 25 can be employed around the peripheral lip 27 of the assembly 10 to seal with the receptacle 11 to prevent water from entering the interior of the unit.

The top casting assembly 10 has a somewhat triangularly or trowel-shaped cavity 26 therein to provide a light channel in front of a refracting optical member or lens 28 located in an opening or window at the inner end of said channel' The top surface around the cavity 26 has been cut away slightly to present inclined and squared away side portions 30. The inclined side portions 30 minimize the possibility of snow plow dolly wheels and aircraft tail hooks or the like from snagging on the lighting unit or damaging the lens thereof. The bottom of the trowel-shaped channel 26 has been dipped to a maximum point at 32 so as to cause water and other undesirable material to drain away from the lens 28 and down into the recessed dip 32. It is of course understood that the recessed dip at 32 is optional and that the lighting unit would be operable if a flat undipped trowel bottom were used. The directional arrow 24 can be inscribed in the bottom surface of the cavity as previously described.

The top casting assembly 10 generally utilizes a lamp 34 with end recesses 36 such as best seen in FIG. 3. The lamp 34 is preferably a quartz lamp, which is quite compact, as is well known, but it is to be understood that other lamps can be used if desired. It is also to be understood that lamps of varying wattages, such as 45 watt or 200 watt, can be employed in the present invention. The lamp 34 has at least one vertically flattened end section 38 which abuts against projections or lugs 40 extending downwardly from the assembly 10 so that a seal located on one side of the end section 38 and accordingly, the filament (neither shown) of the lamp 34 can be mounted in only one position with respect to the lens 28.

In the embodiment as shown, the lamp 34 is laterally spaced from all portions of the lens 28 and is positioned slightly below the lens 28 and the curved light-entrance face thereof.

Contacts 42 are L-shaped having two legs 44 and 46 with the wider flat parts of each disposed at approximately 90° with respect to one another. Each leg 46 has an end 48 which is integrally engaged with a heat sink 50 so as to provide support for the lamp and form an electrical contact therewith. Formed within the heat sink 50 is a conductor member 51 which serves to electrically connect the leg 46 of the contacts 42 to the lamp 34. Additionally, because the conductor members 51 fit in the cavities 36 the lamp 34 is supported thereby. The heat sinks 50 serve to add in removing excess heat by the lamp 34 and its operating components so as to keep its operating temperature at a more efficient level. The other leg 44 of the contact member 42 serves to contact an electrical button in the bottom receptacle 11 to complete the circuitry from the power source (not shown) to the lamp 34. Each contact 42 is mounted on an insulator strip 52, preferably made of a polyester, glass or other suitable insulating material, which is in turn mounted to the assembly 10 by means of screws 54. A guiding projection 58 extends downwardly from the assembly 10 and includes a flattened surface to coincide with an edge of the insulator strip 52 to correctly position that strip and, in turn, the contact member 42 when the strip is secured to the projecting lug 58 by means of the screw 54. If desired, a rivet 56 or the like can be used to secure each contact member 42 to each insulator strip 52. It can thus readily be seen that the pair of contacts 42 serve to position the lamp 34 as well as to provide for a portion of the electric circuitry of the lighting assembly.

If desired, a reflector 60 can be mounted adjacent the back portion of the lamp 34 so as to additionally make use of the light that is directed in a direction opposite from that of the lens 28. A large percentage of this reflected light passed through the lens and will substantially increase the strength of the main beam emanating from the inset lightnig unit. A screw 62 engaged with an aperture in the assembly 10 is inserted into an opening in an upper horizontal flange 64 of the reflector 60 so as to securely hold the reflector in its operative position. In this way the reflector is easily positioned and installed and is readily detachable.

Figure 5:
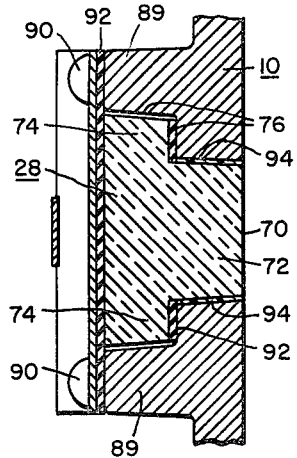
FIG. 5 is a partial cross-sectional view of the assembly of FIG. 3 taken substantially along the reference line V—V thereof.
Figure 6:
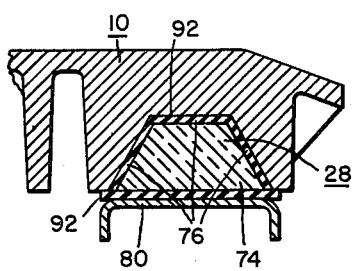
FIG. 6 is a partial cross-sectional view of the assembly of FIG. 3 taken along the reference line VI—VI thereof.
Figure 4:
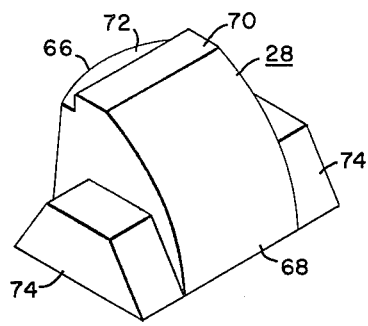
FIG. 4 is an isometric view of an optical structure formed according to the principles of this invention.

The general configuration of a preferred form of the optical member of lens 28 is most clearly shown in FIG. 4. It includes a generally rectangular body portion having a curved light entrance face 66 and a convex curved front exit face 68. It further includes a top surface 70 the height of which determines the uppermost extent of the exit face 68. A top stepped down surface 72 serves as an abutting shoulder for the casting of the assembly 10 to mate with. Integrally formed with the rectangular body portion of the lens 28 are the trapezoidal side flanges 74 which serve to mount the lens 28 within complementary, trapezoidal shaped cavities 76 formed in a casting of the assembly 10, as shown in FIGS. 5 and 6. It is to be understood that when referring to the curved entrance face 66 and exit face 68 of the lens 28 that these are preferred forms and that in other embodiments these faces may be curved in a variety of ways and a design could even be made where one of these faces is flat and both curvatures are placed in the other face. It is to be further understood that the use of the term "lens" in describing the optical member 28 is for convenience, with the intent that it comprehends not only curved but planar refracting surfaces, or a combination of both, necessary to accomplish the desired results. Often because of the difference of filament size in different wattage lamps, the particular curvatures of the lens are particularly adapted for a particular wattage lamp.

Besides the engagement of the flanges 74 of the lens 28 with the cavities 76 of the casting, the lens 28 is also abutted against the casting lip 78 through means of the lens shoulder 72. The lens 28 is further supported by means of a preferably metallic plate 80 located across its bottom face 82 so as to act as an opposing force to the downwardly directed forces provided by the lip 78 and the cavities 76. The supporting plate 80 can be U-shaped as shown or can be of any other shape and material sufficient enough to stand the stresses applied thereagainst. The screws 90 serve to firmly secure the support plate 80 to the assembly 10 through threaded bosses 89. The bosses 89 are preferably of such a length that the support plate when engaged therewith will not place any undue stresses on the lens 28. It should be noted that the assembly further includes a shoulder 91 which limits movement of the lens 28 backwardly into a window or opening 93 of the casting assembly.

The bracket or spring clip 84 is for supporting a color filter and is secured to the assembly 10 by means of a screw 86 passing through the bottom leg of the bracket and being engaged with an aperture in the casting of the assembly 10. The bracket 84 is properly located not only by means of the bolt 86 but by means of the upper extent of its upright leg being positioned between a pair of gussets 88 formed integrally in the casting. When a color filter is not desired the bracket 84 need not be included in the assembly 10.

From the above description, it can readily be seen that the support plate 80 and its mounting bolts 90 must carry nearly all of the load that is applied to the top of the lens 28. The flanges 74 are, as previously mentioned, trapezoidal shaped so that the lens 28 will not try to rotate when uneven or other than vertical loads are applied to the front exiting face or surface 68 of the lens 28. To aid in minimizing the dangers of top loading of the lens 28, a material 92 with very low compressibility is used as a cushion between the lens flanges 74 and the cavities 76 and between the bottom face 82 of the lens and its support plate 80. In addition, a room temperature vulcanizing silicon rubber or similar caulking material 94 is used as a seal between the sides of the lens and the casting to provide a sealed optical system. The caulking or rubber material 94 is a flexible compound which is used to seal out water, dirt, and other undesirable material and is adapted to withstand the high temperatures encountered when the lamp 34 is of the high intensity variety.

With the top surface 70 of the lens 28 exposed, it is not subject to contact by snow plow blades, dolly wheels, tail hooks, tire chains, etc., that may run over the lighting unit, as previously explained. Since glass is a relatively fragile material, the exposed surface has been made as small as possible consistent with optical requirements. Nevertheless, the lens 28 desirably is made of the strongest glass available to withstand the exposure above described and to eliminate as much as possible scratching and other undesirable modifying effects. A borosilicate glass with both high heat resistant and mechanical strength properties has been found to be adequate for runway applications. An example of such a heat treated borosilicate glass is that identified under the trademark "Pyrex" by the Corning Glass Works of Elmira, New York.

Figure 8:
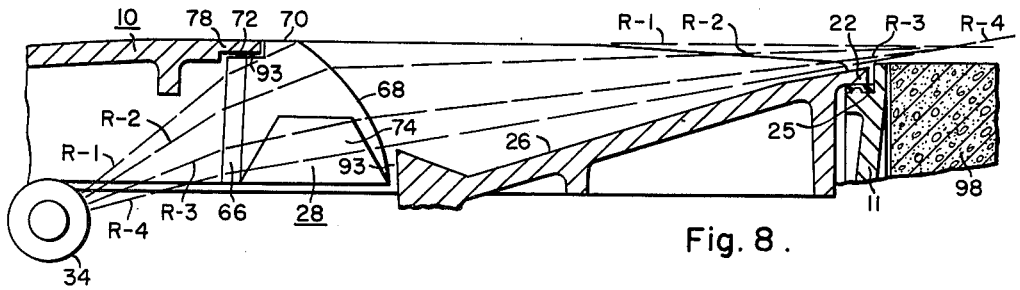
FIG. 8 is a view similar to FIG. 2 only primarily directed towards the optical system and light ray traces and eliminating for clarity other mechanical structure unnecessary to show the system, and including a portion of the runway surface in which said assembly is mounted.

FIG. 8 is a diagrammatic illustration of the optical system of the lighting unit shown in FIGS. 1 to 3 and is a view similar to that shown in FIG. 2 only eliminating the structures not necessary to the description of the optical effects of the unit and, further, including a portion of a bottom receptacle 11 and a runway surface 98 in which the lighting unit is mounted. For illustrative purposes sample light rays R-1, R-2, R-3 and R-4 have been chosen to indicate the optical effect produced by the system. The light ray R-1 is the uppermost light ray which is emitted from the exit face 68 of the lens 28. Due to the curvature of the exit face 68 and the relative position of the lamp 34 with respect thereto the light ray R-1 exits generally at an angle of zero degrees with respect to the surface 98 of the runway. Since the top surface 70 of the lens 28 is designed to be at a slight distance above the runway surface 98, the light ray R-1 will also be that same slight distance above the runway surface, so as to in effect be parallel therewith. The other light rays R-2, R-3 and R-4 leave the exit face 68 of the lens 28 at angles slightly greater than zero degrees with respect to the runway surface 98 with the incidence of the light ray R-3 being slightly greater than that of R-2 and that of R-4 being slightly greater than that of R-3, and so forth.

Figure 9:
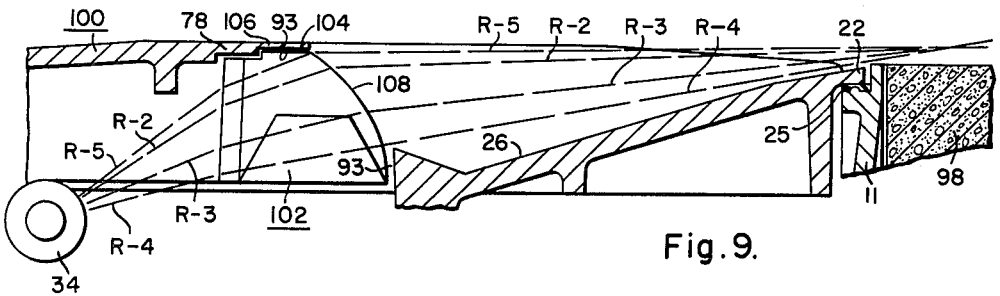
FIG. 9 is a view similar to FIG. 8 but showing a somewhat modified optical system.

A slightly different form of the present invention is illustrated in FIG. 9 wherein a top casting 100 and a lens 102 is employed. The lens 102 differs from the lens 28 employed in FIG. 8 only in that its top surface 70 has been grounded down a slight bit so as to form a lower top surface 104. Correspondingly, an extended lip portion 106 has been formed on the top casting 100 so as to act as a thin cover for the top surface 104 to even further minimize the problems of impact and pressure upon the lens 102. However, to achieve the additional protection of the lip 106, the height of the exit face 108 has been slightly reduced from that of the exit face 68 of FIG. 8 so that the uppermost ray R-5 of FIG. 9, although still parallel with the surface 98 of the runway is at a more closely spaced distance with respect thereto. This does mean that fewer light rays at an angle of zero degrees or very close thereto can be emitted from the lens 102 than from the lens shown in FIG. 8. Light rays R-2, R-3 and R-4 are again illustrated in FIG. 9 to show that they remain the same. In all other respects the top casting and lens and other components of FIG. 9 are like those of FIG. 8 and, accordingly, like reference numerals have been applied to like portions thereof.

Figure 10:
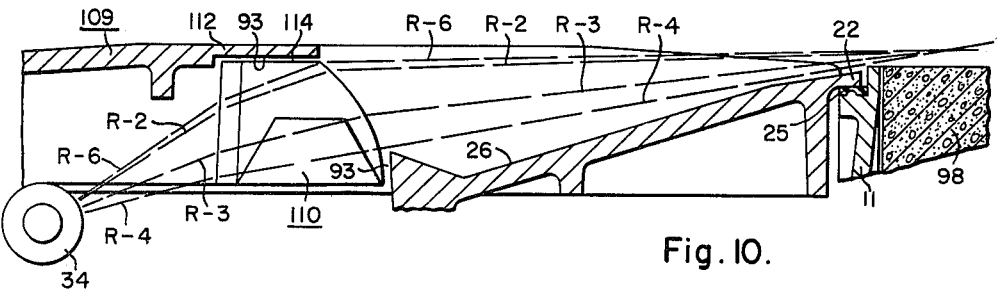
FIG. 10 is a view similar to that of FIG. 8 but showing another modified optical system.

Another modification of the present invention is illustrated in FIG. 10 which includes a top casting 109 and a lens 100. The lens 110 is similar to the lens 28 of FIG. 8 only the top surface 70 thereof has been completely ground off so that the surface 72, or its equivalent surface 114 in FIG. 10, extends completely across the top of the lens. This arrangement even further minimizes the impact and pressure exerted upon the lens 110, in effect practically reducing it to zero, but again at a sacrifice of the number light rays more nearly able to approach an angle of zero degrees with respect to the runway surface 98. Actually, since the top surface 114 of the lens 110 is no higher in elevation than the top surface 98 of the runway, even the uppermost ray R-6 must be inclined at a slight angle with respect to the runway surface. This is the least preferably, optical wise, of the modifications disclosed here and need be used only under the severest of conditions.

Figure 11:
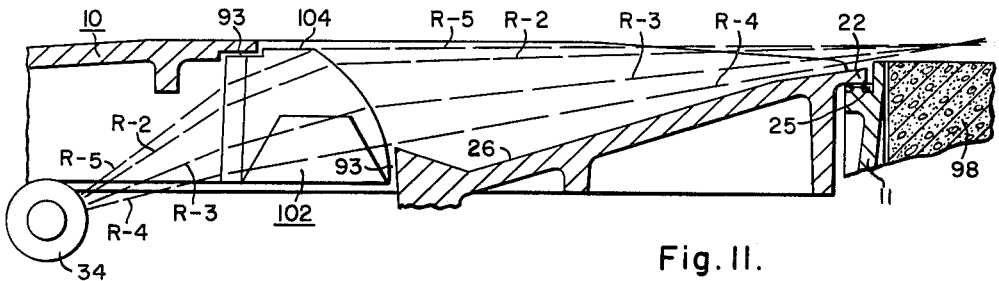
FIG. 11 is a view similar to FIG. 8 but showing still another modified optical system of the invention.
Figure 12:
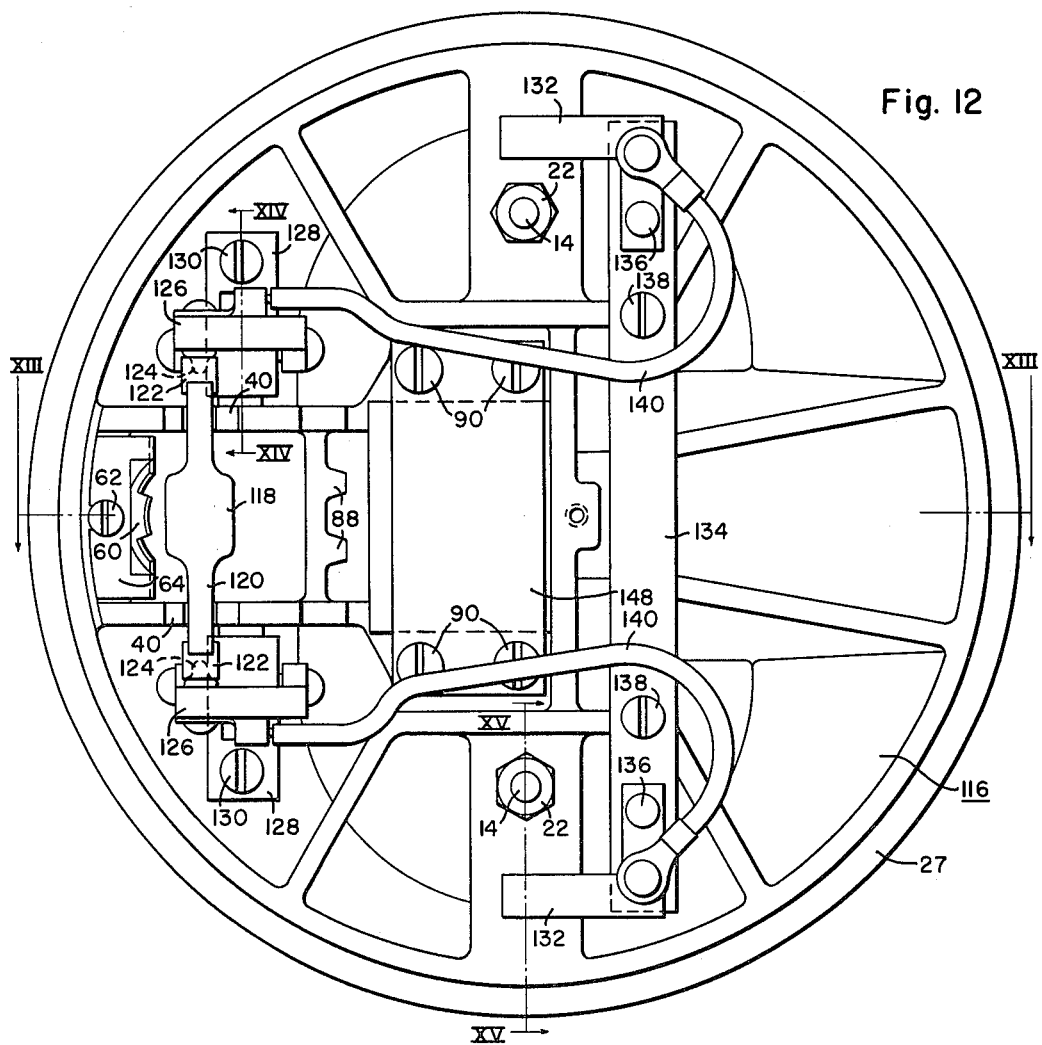
FIG. 12 is a bottom plan view of another optical assembly of the lighting unit of FIG. 1 and arranged according to the invention.

A still further modification is illustrated in FIG. 11 which incorporates the top casting of the assembly 10 employed in the modification of FIG. 8 and the lens 102 employed in the modification of FIG. 9. Although this arrangement gives no better optical effects from that illustrated in FIG. 9, it does permit the use of a standard top casting, as shown in FIG. 8, while decreasing the pressure effects against the lens 102 as compared with that which would be received by the lens 28 of the modification of FIG. 8. The surface 104, by being recessed a slight distance below the top surface of the casting assembly 10, renders the lens 102 less likely to be contacted by objects passing thereover even though it is not covered by a lip such as the lip 106 shown in the modification of FIG. 9. Thus, there is illustrated in FIG. 11 a modification of the unit of FIG. 8 wherein the top surface 70 of the lens 28 can be just slightly ground down so as to compromise the optical effect to only a limited extent but, at the same time, to minimize contact by objects passing over the lens employed.

It is, of course, understood that the principles of the optical systems illustrated in FIGS. 8 to 11 and, in particular, the lens units 28, 102 and 110 can be employed in different optical assemblies than are illustrated in FIGS. 1 to 3, for example. As illustrative of possible varying optical assemblies and top castings that may be employed, there is hereinafter described the embodiments of FIGS. 12 to 15 and FIGS. 16 to 18.

If the top casting and optical assembly 116 were viewed from the top, it would appear substantially the same as that illustrated in FIG. 1 for the assembly 10. The primary difference between the assemblies 10 and 116 therefore reside in the internals of the respective structure. It is understood that both of the assemblies 10 and 116 are adapted to serve substantially the same function, that is, to provide a unidirectional inset lighting unit adapted to render a light beam substantially or very nearly parallel with a runway surface. Since the assemblies 10 and 116 are similar in many respects, the same reference numerals are applied to common components of the two assemblies to expedite the description.

The casting and optical assembly 116 differs from the previously described unit primarily in its lampholder and electrical contact arrangement and in the supporting plate for the lens structure. The lamp 118 in the assembly 116 contains flattended end extensions 120 which are adapted to abut against the lugs 40 to properly align the lamp with the lens 28. The lamp 118 contains heat sinks 122 integral therewith and at the opposite ends of the extensions 120 to aid in dissipating the heat generated by the lamp 118 when in operaion. The heat sinks 122 are provided with recesses or cavities 123 to receive the male projections 124 of the lampholders 126 which provide the electrical contact for the lamp 118 with the power source, as described later, as well as provide for the support thereof.

Figure 15:
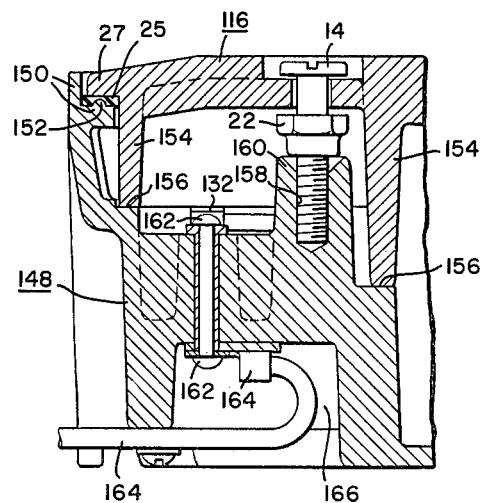
FIG. 15 is a partial cross-sectional view of the assembly of FIG. 12 taken along the reference line XV—XV thereof and including, in addition, a portion of a bottom receptacle assembled therewith.

The lampholders 126 are supported from the casting assembly 116 by means of plates 128 and the screws 130. If the lampholder 126 is made of insulating material it is not necessary that the plate 128 be made of insulating material also but that it can be of any strong structural material such as steel or the like. The threaded boss 146 receives the screws 130 for attaching the plate 128. In this instance, the lamp contacts 132 are not an integral part of the lampholder 126 but are located a substantial distance therefrom on a connecting electrical conductor type plate 134. The contacts 132 are L-shaped as are the contacts 42 of FIG. 3 but do not have their sides disposed at a 90° angle with respect thereto as do the contacts 42. The contacts 132 can be secured to the plate 134 by any convenient means, such as by rivets 136. The plate 134, in turn, is secured to the casting assembly 116 by means of screws 138 protruding through the plate 134 and into a rib or boss, not shown, in the casting assembly. The leg of the contact 132 which does not contain the rivet 136 is used to contact a button located on the longitudinal center line of a bottom receptacle, as shown in FIG. 15 described later. The interconnection between the lampholder 126 and the contacts 132 are made through the electric conductor 140 which is secured to each at its opposite ends by conventional means, such as insulator bushings or the like. It can be seen from FIG. 14 that the lampholder 126 is biased by means of a spring 142 engaging a shoulder 144 on the lampholder and a surface of the plate 128. The spring biasing of a lampholder 126 makes for ready insertion and removal of the lamp 118 whenever desired by simply spreading the opposing lampholders 126 apart and then releasing them when necessary. The advantages of this organization is that when a separate lampholder 126 is used this lampholder can aid in dissipating the heat generated by the lamp 118 so as to increase the efficiency of the operating assembly. Also as a matter of convenience it is better to have the assembly contacts 132 meet the contact buttons of the bottom recepacle on the center line of the receptacle.

Figure 13:
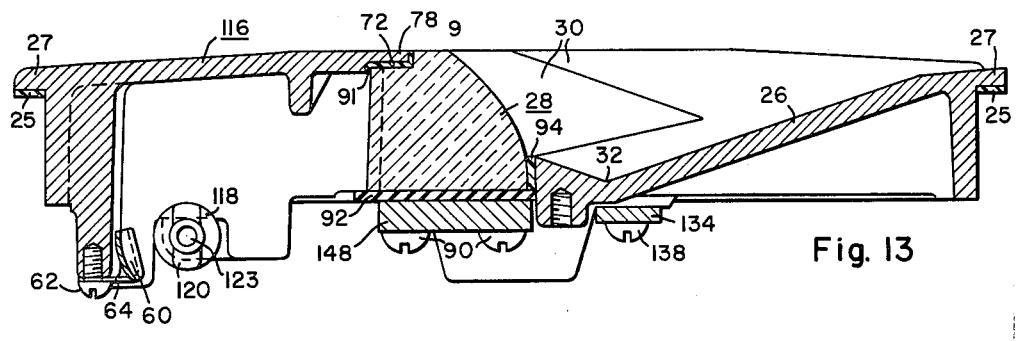
FIG. 13 is a cross-sectional view of the asesembly of FIG. 12 taken along the reference line XIII—XIII thereof.

The support plate 148 as employed in the assembly 116 differs from the U-shaped supporting plate 80 employed in assembly 10 in that it is a solid heavy gauge piece of metal, such as steel or the like, rather than a thinner U-shaped member. The advantage of using a heavier gauge supporting plate of the nature as that shown in FIG. 13 is that it gives a firmer base for the support of the lens 28 as well as provides a greater amount of material to absorb any impact or shock transferred thereto. Also, a heavier supporting plate like that shown in FIG. 13 will tend to resist any bending stresses applied thereagainst more readily than will a thinner plate of substantially the same configuration. Although the supporting plate 148 differs in structure from that described with respect to the assembly 10, the mounting thereof is substantially the same, that is, by mounting bolts 90 engaged with bosses, not shown, extending downwardly from the top of the assembly casting 116.

For more clearly illustrating the relationship between the casting assembly 116 and its bottom receptacle, there is illustrated in FIG. 5 a broken-away portion of the combination. It can be seen that the bottom receptacle 148, which is basically similar to the receptacle 11 referred to previously, contains an L-shaped flange portion 150 to provide a seat for the extending lip 27 around the periphery of the assembly 116. The bottom of the flange seat 150 contains a protrusion 152 which bites into the gasket 25 when the assembly 116 and the bottom receptacle 148 are engaged together so as to prevent the gasket 25 from being squeezed out from under the lip 27. This arrangement, as can be readily seen, provides an adequate seal between the peripheries of the assembly 116 and the bottom receptacle 148. The assembly 116 contains ribs 154 which seat on shoulders 156 of the bottom receptacle to limit the effect of any undue stresses placed on the top surface of the assembly 116. The bolt 14 engages the threaded aperture 158 of the boss 160 to secure the bottom receptacles 148 and the assembly 116 together. The contact member 132 engages the contact button 162 of the bottom receptacle which in effect is an elongated rivet for also securing the power lead 164 to the bottom receptacle 148 to complete the circuitry from the power source, not shown, to the lamp 118. The arrangement of these component parts and the use of an insulator bushing 164 are much the same as that disclosed in the aforementioned copending application as well as is the wireway arrangement indicated here by the reference numeral 166.

Figure 16:
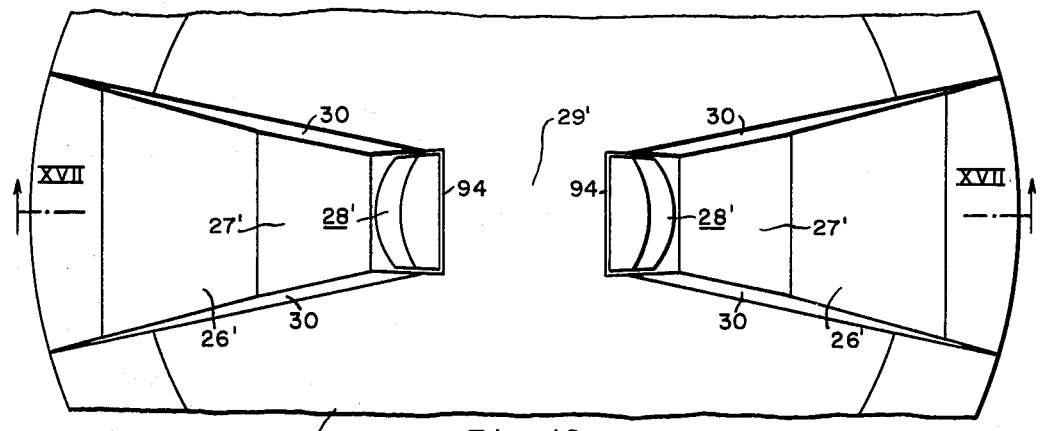
FIG. 16 is a partial top plan view of another top casting and optical assembly constructed in accordance with the principles of this invention.
Figure 17:
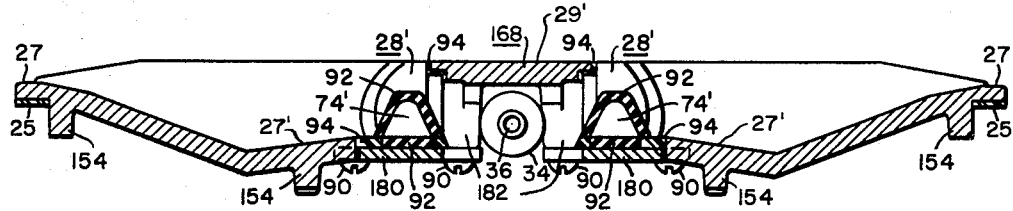
FIG. 17 is a cross-sectional view of the assembly of FIG. 16 taken along the reference line XVII—XVII thereof.
Figure 18:
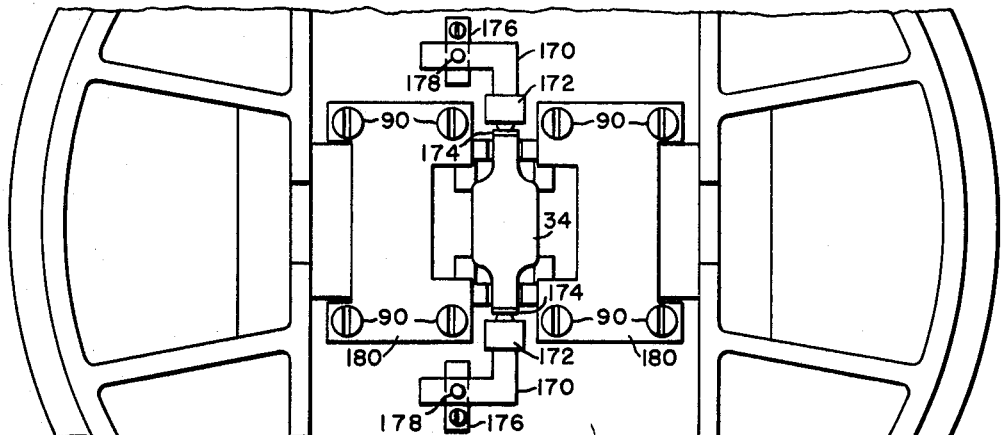
FIG. 18 is a partial bottom plan view of the assembly of FIG. 16.

As stated previously, the modification as shown in FIGS. 16 to 18 is here disclosed to show an adaptation of the principles of the present invention to a bidirectional inset lighting unit assembly. Where component parts are basically similar in structure, they have been similarly indicated with common reference numerals employed in the previous modifications above described. The chief difference between the bidirectional unit and the unidirectional unit is that the lamp and lens component of the former are located in the center of the unit rather than at one end thereof, and the channels or troughs for the light rays to pass out of the unit are somewhat foreshortened so as to extend less than halfway across the width of the unit. Thus, the bidirectional casting and optical assembly 168 includes a pair of generally opposed troughs or channels 26' spaced approximately 180° apart so that light beams can extend in opposite directions from a pair of lens 28'. The inwardly extending extremities 27' of the troughs 26' are separated by a centrally disposed portion 29' of the housing. With respect to the troughs 26', it is to be understood that it is within the scope of this invention to slightly incline or toe-in these cavities so they are not exactly 180° from one another when it is desired to place the units off of the runway center line in what is commonly known as a narrow gauge lighting system such as described in another copending application to W. A. Pennow et al., Serial No. 33,312, filed June 1, 1960, entitled "Runway Lighting Unit," now abandoned, and assigned to the same assignee as is this invention.

The assembly 168 incorporates a lamp 34 so that its light center is directly in the center of the assembly 168 and equally spaced from each of the lens 28' by means of contact 170 which contain heat sinks 172 having male projections 174 for engaging the cavities 36 in the ends of the lamp 34. The contacts 170 are secured to the casting of the assembly 168 through means of the insulator plates or strips 176 and the screw 178 somewhat as described previously with respect to FIG. 3 (see strip 52).

It has been found more advantageous in the assembly 168 to employ I-shaped supporting plates 180 rather than the rectangularly-shaped supporting plates used in the other modifications previously described. The main reason for this shape is to provide room for color filters on each side of the lamp 34 when this is desired as well as to minimize the structural material needed to construct the support plate 180. The support plate 180, however, is substantially similar to that employed in the modification of FIG. 12 in that it is the thick support plate type rather than the thinner U-shaped adaptation. Similarly, it is held to the casting by means of the bolts 90 extending through the supporting plates 180 and into bosses 182 which space the supporting plates so that it gives a firm support to the lens 28' without causing any undue stresses thereon. Of course, it is understood that in the bidirectional assembly 168 reflectors such as employed in the unidirectional luminaires cannot be used. The reason for this is that reflectors are adapted to receive light admitted in a direction opposite from that of the lens and since there are lens on each side of the lamp 34, all the light extending in the opposite directions is received by their respective lens, thus eliminating the need for such a reflector.

It is further noted that the lens 28' in FIG. 16 is somewhat different from the lens 28 in FIG. 1 in that the former includes a compound curvature in its exit face while the latter does not. As stated previously, the particular contours employed in a lens is determined by the size of lamp used and the type of beam desired. In the instance of the lens 28' it is desired that a beam with a narrower lateral spread be obtained than that given by the lens 28. Also the lens 28' is adapted to be used with a lamp having a smaller filament than that used in the lamp cooperating with the lens 28. It is to be understood that the different lens 28 and 28' are shown for exemplary purposes only and that they can be exchanged for one another or for other differently contoured lens when the conditions and results desired warrant. The flanges 74' of the lens 28 differ in size and shape from the flanges 74 of the lens 28 to more readily conform to the compound curvatures of the lens 28'. The effect of the flanges 74', however, will be substantially the same as that of the flanges 74.

Thus, there has been disclosed a novel flush-mounted inset lighting arrangement which includes a novel lens structure and mounting means so as to provide an optical system which is able to provide a maximum number of light rays which more closely approach an angle of zero degrees with respect to the surface of the runway and thus furnish the most desirable light distribution pattern. The design incorporated in this invention is additionally concerned with minimizing the impact and pressure factors applied against such lens and with preventing non-seating of the lens when vertical and non-vertical forces are applied thereagainst. The principles of the present invention are equally well adapted to unidirectional and bidirectional lighting units.

Since it is obvious that the invention can be embodied in other forms and constructions within the spirit thereof, as would be apparent to one skilled in the art, it is to be understood that the particular forms shown are but a few of such embodiments. Accordingly, with various modifications and changes being possible, the invention is not limited in any way with respect thereto. Moreover, it is to be understood that certain features of the invention can be employed without a corresponding use of other features thereof.

We claim as our invention:

1. A runway lighting unit including a housing having a downwardly tapering trough in a surface thereof, a window formed in said housing at the lower end of the trough and extending upwardly to the surface of said housing, a refracting member located in said window, said refracting member including trapezoidal-shaped side flanges, said refracting member being engaged with said housing by means of said flanges being located in similar trapezoidal-shaped cavities in said housing, a support plate adjustably secured to said housing and located under the bottom of said refracting member, and resilient means between said support plate and said refracting member, said support plate resiliently securing said refracting member within said housing so that it is exposed to said window, whereby said support plate and said flanges absorb downwardly directed or torsional impacts to which said refracting member may be subjected.

2. A runway lighting unit including a top casting having a downwardly tapering trough in the top surface thereof, a window formed in said casting at the lower end of the trough and extending upwardly to the top surface of said casting, a refracting lens located in said window, said lens including trapezoidal shaped side flanges, said lens being engaged with said casting by means of said flanges being located in similar trapezoidal-shaped cavities in said casting, a support plate adjustably secured to said casting and located under the bottom of said lens, and resilient gasketing means between said support plate and said lens bottom and between said cavities and said flanges, said support plate resiliently securing said lens within said casting and exposed to the vertical extent of said window, a light source located adjacent the side of said lens opposite from said trough, and a reflector located on the other side of said light source opposite from said lens so that light-rays from said light source and said reflector are received by said lens and directed out of the lighting unit through said trough.

3. A runway unit including a top casting having a downwardly tapering trough in the surface thereof, a window formed in said casting at the lower end of said trough and extending upwardly to the top surface of said casting, a refracting member located in said window and secured to said casting, said refracting member providing substantially all the necessary directional correction for the unit, and said refracting member including an exposed top surface portion and an unexposed top surface portion, the exposed portion being substantially flush with the top surface of said casting and the unexposed surface being engaged by a lip of said casting, a light source secured within said casting and located on the side of said refracting member opposite from said trough, said refracting member having an entrance face and exit face for receiving light rays emitted by said light source, said entrance face extending from the bottom of said refracting member to the top of the unexposed top surface thereof, said exit face of said refracting member extending from the bottom of said refracting member to the exposed top surface thereof and having such a curvature that substantially all of the light rays from said source leave said runway unit substantially parallel with the top surface of said top casting.

4. A runway unit including a top casting having a downwardly tapering trough in the surface thereof, a window formed in said casting at the lower end of said trough and extending upwardly to the top surface of said casting, a refracting member located in said window and secured to said casting, said refracting member including an exposed top surface portion and an unexposed top surface portion, the exposed portion being substantially flush with the top surface of said casting and the unexposed surface being engaged by a lip of said casting, a light source secured within said casting and located on the side of said refracting member opposite from said trough, said refracting member having an entrance face and exit face for receiving light rays emitted by said light source, said entrance face extending from the bottom of said refracting member to the top of the unexposed top surface thereof, said exit face of said refracting member extending from the bottom of said refracting member to the exposed top surface thereof so that at least a portion of the light rays from said source leave said refracting planes substantially in line and parallel with the top surface of said top casting, extensions formed on the sides of said refracting member, said extensions mating with similarly shaped cavities in the interior of said casting, bosses integral with said casting and extending downwardly from the top thereof at least to the bottom of said refracting member, support means attached to bosses and located under said refracting member, and cushioning means positioned between said refracting member and said support means so that said refracting member is resiliently and firmly secured within said casting without undue stresses being applied thereto.

5. A runway lighting unit including a top casting having a plurality of downwardly tapering troughs in the surface thereof, an opening formed in said casting at the lower end of each trough and extending upwardly to the top surface of said casting, a refracting member located in each opening and extending substantially to the top thereof, extensions formed on the sides of each refracting member, said extensions located in similarly shaped cavities in said casting, a support plate adjustably secured to said casting beneath the bottom of each refracting member, cushioning material located between said support plate and said refracting member and between said extensions and said cavities, sealing means between the other adjacent surfaces of said refracting members and said casting, and a receptacle sealably receiving said casting so as to present a sealed optical system.

6. A runway lighting unit including a top casting and optical assembly, a lens located in a top opening in said casting, elongated contacts secured to the underside of said casting and located generally along a centerline thereof, hinged lampholders secured to the underside of said casting and located adjacent said lens, a lamp releasably held by said lampholders so as to emit light rays through said lens, heat dissipating means on said lampholders removing heat from said lamp, a reflector secured to the underside of the casting on the side of said lamp opposite from said lens, and electric conductors connecting said contacts to said lampholders, said lampholders and said heat dissipating means serving to increase the efficiency of said assembly by reducing the operating temperature of said lamp.

7. A refracting member for a runway lighting unit comprising a generally rectangular body portion, said body portion including a stepped top surface, a light entrance rear surface, a light exit front surface, said light entrance surface being curved with respect to a vertical axis, and said light exit surface being curved with respect to a horizontal axis, and trapezoidal side flanges integrally formed with the sides of said body portion for holding said refracting member in similarly shaped trapezoidal cavities in said unit.

8. A runway lighting unit comprising:
 (a) a housing having a top surface, and a trough-shaped cavity provided in said top surface;
 (b) a light-refracting means located at one end of said trough, said light-refracting means having a top surface, a convex exterior surface facing said trough, and a lateral surface facing away from said trough, and at least a portion of the top surface of said refracting means being substantially flush with the top surface of said housing;
 (c) light source means positioned within said housing and spaced laterally from and slightly below the lateral surface of said refracting means which faces away from said trough; and
 (d) the configuration of said refracting means and the positioning of said light source means with respect to said refracting means causing light from said light source means to strike the lateral surface of said refracting means which faces away from said trough and to pass uninterrupted through said refracting means to the convex exterior surface of said refracting means, and the light from said light source means on passing through said refracting means being refracted downwardly a predetermined amount upon entering and again upon leaving said refracting means so that substantially all light leaving said lighting unit passes through said cavity in a substantially horizontal direction.

9. The lighting unit as specified in claim 8, wherein a portion of the top surface of said housing extends over at least a portion of the top surface of said refracting means to protect same.

10. In a runway lighting unit comprising:
a shallow housing adapted to be generally horizontally disposed and having a top surface provided with a radial trough terminating proximate the center thereof, said housing adapted to be mounted with the top surface thereof projecting only slightly above the runway;
a light refracting means positioned within said housing at the inner end of said trough, said refracting means having an interior curved light entrance face positioned in said housing and convexly rounded about its horizontal dimension, said entrance face disposed away from said trough, said refracting means having an exterior light exit face disposed towards said trough, said light exit face disposed at an incline with its upper portion positioned closer to said light entrance face than its lower portion;
an elongated compact light source generally horizontally supported within said housing and spaced laterally from all portions of said refracting means and slightly below said entrance face on the opposite side from said trough;
the curved entrance face of said refracting means and the positioning of said light source with respect thereto causing substantially all of the light emanated directly from said light source and striking said entrance face to be refracted a predetermined amount and to pass uninterrupted in a straight line through said refracting means, and upon leaving said refracting means through said light exit face to be refracted downwardly a predetermined amount due to the inclination of said exit face so that substantially all of the light leaving said exit face passes through said trough in a substantially horizontal direction.

11. In a runway lighting unit comprising:
a shallow housing adapted to be generally horizontally disposed and having a top surface provided with two radial troughs both extending toward the center thereof with their inwardly extending extremities separated by a centrally disposed portion of said housing, said housing adapted to be mounted with the top surface thereof projecting only slightly above the runway;
two light refracting means positioned within said housing, one at the inner end of each said trough, each of said refracting means having an interior light entrance face positioned in said housing and convexly rounded about its horizontal dimension and disposed away from the corresponding trough in said housing, each of said refracting means having an exterior light exit face disposed towards the corresponding trough, each of said light exit faces disposed at an incline with its upper portion positioned closer to the corresponding light entrance face than its lower portion;
an elongated compact light source generally horizontally supported within said housing and spaced between and laterally from all portions of said refracting means and slightly below said entrance faces;
the curved entrance faces of said refracting means and the positioning of said light source with respect thereto causing substantially all of the light emanated directly from said light source and striking said entrance faces to be refracted a predetermined amount and to pass uninterrupted in a straight line through said refracting means, and upon leaving said refracting means through said light exit faces to be refracted downwardly a predetermined amount due to the inclination of said exit faces so that substantially all of the light leaving said exit faces passes through said troughs in a substantially horizontal direction.

12. The lighting unit as specified in claim 11, wherein said two radial troughs are colinearly disposed with respect to one another.

References Cited by the Examiner
UNITED STATES PATENTS

| | | | |
|---|---|---|---|
| 3,015,717 | 1/1962 | Angier | 240—1.2 |
| 3,066,217 | 11/1962 | McDonald | 240—1.2 |
| 3,155,321 | 11/1964 | McDonald | 240—1.2 |

FOREIGN PATENTS 730,227　5/1955　Great Britain.

NORTON ANSHER, *Primary Examiner.*